United States Patent [19]
Takimoto et al.

[11] Patent Number: 5,438,083
[45] Date of Patent: Aug. 1, 1995

[54] COLLOIDAL PARTICLE DISPERSION AND WATER-BASED COATING COMPOSITION

[75] Inventors: Masaaki Takimoto, Osaka; Minao Izumi, Hyogo; Hisataka Yamamoto, Tokyo, all of Japan

[73] Assignee: Nippon Paint Co., Ltd., Osaka, Japan

[21] Appl. No.: 183,855

[22] Filed: Jan. 21, 1994

[30] Foreign Application Priority Data

Jan. 21, 1993 [JP] Japan ................... 5-008636

[51] Int. Cl.⁶ .................. C08K 3/20; C08L 63/02
[52] U.S. Cl. ................... 523/401; 523/416; 524/444
[58] Field of Search ............... 523/401, 416; 524/444

[56] References Cited

U.S. PATENT DOCUMENTS

3,937,679  2/1976  Bosso et al. ................... 525/453

FOREIGN PATENT DOCUMENTS

| 0307996 | 3/1989 | European Pat. Off. | C09D 3/72 |
| 62-73938 | 4/1987 | Japan . | |
| 62-283161 | 12/1987 | Japan | C09D 3/58 |
| 64-65179 | 3/1989 | Japan | C09D 3/72 |

OTHER PUBLICATIONS

Katz and Milewski, Handbook of Fillers and Reinforcements for Plastics, pp. 138–140 (1978).

*Primary Examiner*—Melvyn I. Marquis
*Assistant Examiner*—D. Aylward
*Attorney, Agent, or Firm*—Sughrue, Mion, Zinn, Macpeak & Seas

[57] ABSTRACT

A colloidal particle dispersion is disclosed, comprising mainly (1) a fumed silica or fumed aluminum silicate, (2) a colloidizing agent (aid) which is at least one compound selected from the group consisting of a phosphoric acid compound, a molybdic acid compound, a boric acid compound, and a silicic acid compound, and (3) water, and a method for preparing the same is disclosed. Further, a water-based coating composition is disclosed, which comprises a water-based coating composition and incorporated therein a colloidal particle dispersion comprising mainly (1) fumed silica or fumed aluminum silicate, (2) a colloidizing agent (aid) which is at least one compound selected from the group consisting of a phosphoric acid compound, a molybdic acid compound, a boric acid compound, and a silicic acid compound, and (3) water, and a method for preparing the same is disclosed. Furthermore, the coating method with which the above water-based coating composition on a metal substrate is disclosed.

10 Claims, No Drawings

COLLOIDAL PARTICLE DISPERSION AND WATER-BASED COATING COMPOSITION

FIELD OF THE INVENTION

The present invention relates to a novel colloidal particle dispersion and a water-based coating composition containing the colloidal particle dispersion. More particularly, the present invention relates to a water-based coating composition for use in forming an organic film in the production of a precoated steel sheet with excellent corrosion resistance, and to a colloidal particle dispersion to be incorporated in the water-based coating composition.

BACKGROUND OF THE INVENTION

Electrogalvanized steel sheet, welding-plated steel sheet, and steel sheets plated with various alloys are produced and extensively used in applications such as electrical appliances, automobiles, and building materials. Under these circumstances, there is a growing desire in recent years especially for surface-treated steel sheets having excellent corrosion resistance, and the demand for such steel sheets tends to increase.

In the automobile industry, the demand for surface-treated steel sheets with excellent corrosion resistance is strong from the standpoints of safety and economy because automotive bodies are exposed to severe corrosive environments, as seen in the corrosion caused by rock salt scattered on roads for the purpose of antifreezing in the North America and other regions and the corrosion caused by acid rain attributable to smokes emitted from industrial areas.

Many improvements have conventionally been made in order to obtain the required corrosion resistance. Developed as such steel sheets with improved corrosion resistance were precoated steel sheets obtained by applying a special resin on the chromate material of galvanized steel sheet. Some of the precoated steel sheets are on the market.

In these precoated steel sheets, improved corrosion resistance is attained by the coated film formed by applying a special resin on the sheet steel in an amount of 0.3 to 5 g/m$^2$.

However, even the precoated steel sheets do not always have sufficient corrosion resistance in a severe corrosive environment. Increasing the coated film thickness in order to ensure corrosion resistance has resulted in a precoated steel sheet which has poor suitability for welding and is virtually unusable for automobiles.

As techniques for further improving the above-described corrosion resistance by improving the anticorrosive properties of a coated film formed in the production of precoated steel sheets, the following have, for example, been disclosed: a method of conducting a treatment with an aqueous solution obtained by adding a colloid (sol) of a silica or the like to an aqueous dispersion of an ethylene-acrylic acid copolymer resin or other resin (JP-A-63-123472); and a method in which a water-based composition obtained by adding a water-dispersible silica and a water-dispersible chromium compound to a dispersion of a copolymer of an α-olefin-α, β-unsaturated ethylenically carboxylic acid is applied to form an undercoat film, on which a topcoat film is formed (JP-A-3-131371). (The term "JP-A" as used herein means an "unexamined published Japanese patent application").

The above two methods each is characterized in that an additive such as a silica is incorporated into a conventional organic resin for the purpose of improving its anticorrosive properties. The silica colloid to be thus used as an additive is a water-dispersible silica or colloidal silica (both of which are an aqueous colloid of a wet (precipitated) silica). These aqueous colloids of wet silica have already been put to the market by several companies, and examples of the commercial products include various grades of SNOWTEX (trade name) manufactured by Nissan Chemical Industries, Ltd., Japan, and various grades of ADELITE (trade name) manufactured by Asahi Denka Kogyo K. K., Japan. These wet (precipitated) silica colloids are produced by a colloidizing technique in which particle size reduction is conducted by cleavage at siloxane bonds in an aqueous solution having a pH of 9 or higher or by the same cleavage in an aqueous solution having a pH of 2 or lower. Most of the colloidal particles thus obtained usually have particle diameters of from 20 to 60 nm and the colloidal solutions are mostly alkaline, with their pH's being from 8 to 12.

That is, in the production of the colloidal silica described above, a wet (precipitated) silica is used and sodium hydroxide (for alkaline colloid production) or acetic acid (for acid colloid production) is added in order to colloidize the silica. Because of this, the wet (precipitated) silica has a low purity (i.e., contains a large amount of impurities such as $Na^+$, $Fe^{3+}$, and $Cl^-$) and comes to have an even lower purity due to the addition of other ions during colloid production (usually contains silicate ions and the like in a large amount). Such low-purity silica colloids have no cation-exchange ability and are still insufficient for use as an additive to be incorporated in coating compositions for imparting high anticorrosive properties to coated films.

The example using the wet silica is shown in the comparative example of Example 4 as comparison.

On the other hand, a fumed silica as a high-purity silica has been put to the market by Nippon Aerosil K. K., Japan, and others under the trade name of AEROSIL. This fumed silica is an amorphous compound which has a network structure consisting of chains built up of tetrahedral $(SiO_2)_n$ arrangements and which has an extremely low impurity content because it has been obtained by hydrolysis at a high temperature of about 1,000° C. (HCl is completely removed from the system because it vaporizes at the high temperature). The fumed silica, therefore, is a material suitable for use as a silica colloid to be added to coating compositions for the purpose of imparting high anticorrosive properties, as compared with the wet (precipitated) silicas described above.

However, the fumed silica, which immediately after production is in the form of unaggregated primary particles (with particle diameters of about 5 to 12 nm), undergoes aggregation attributable to hydrogen bonds formed by water adsorption because it is a hydrophilic silica $(SiO_2)_n$ and has the property of readily adsorbing water. The aggregated particles then relatively readily turn into an amorphous network structure having a silanol group density of from 3 to 6 per nm$^2$ Because of the presence of silanol groups, the fumed silica in an aqueous solution has a chain structure consisting of primary particles linked together into network form. Illustratively stated, the fumed silica (e.g., AEROSIL (trade name) mentioned above) is an acid pigment an aqueous solution of which has a pH of about 4.1 to 5.6, and this acidity is attributable to protons generated from the silanol groups $(SiOH)_n$. It is, however, thought from the silanol group density and the pH that the hydrogen atoms of only a small proportion of the silanol groups have turned into protons, with most of the silanol groups remaining unionized. This indicates that the unionized silanol groups which are present in a large number on the surfaces of the primary particles undergo a silanol-silanol interaction (formation of hydrogen bonds) to bond to one another and, as a result, the primary particles are linked to form chains of a network structure. Linking through a water molecule is also possible, and this linking mode is also based on a hydrogen bond.

Since these hydrogen bonds of the fumed silica in an aqueous solution have a lower bond energy than ionic bonds and covalent bonds, the hydrogen bonds can be cut by applying a physical energy in such a degree as disper stirring (e.g., at 2,000 rpm for 30 minutes) to the solution and, as a result, the network structure can be converted to aggregated particles (colloidal particles). However, the aggregated particles, upon standing, readily turn into larger aggregates or return to particles of a network structure, i.e., become coarser. Because of this, it has been extremely difficult to add the fumed silica in a colloidal state to a coating composition and stabilize the colloidal silica added.

The example using the fumed silica is shown in the comparative example of Example 2 as comparison.

In addition to the high rust resistance described above, a precoated steel sheet of the kind described hereinabove is required to further have suitability for electrodeposition and press processing, spot weldability, corrosion resistance after electrodeposition, and secondary adhesion.

In order to meet these requirements, improvements have conventionally been made on coating compositions for forming the coated films of precoated steel sheets. For example, JP-A-62-73938, JP-A-62-283161, and EP 307996A (corresponding to JP-A-64-65179) disclose a technique for imparting electrodeposition suitability by incorporating the above-mentioned fumed silica. However, a silica content of 27.5% or higher is necessary for obtaining electrodeposition suitability on a virtually required level and such a high silica content not only results in impaired suitability for press processing and spot welding, but causes unevenness of treatment in a degreasing step due to the dissolution or falling of silica particles during the step. Further, JP-A-62-283161 discloses a technique for imparting electrodeposition suitability by incorporating a hydrophilic resin (e.g., a polyamide resin). However, this technique is defective in that the content of the hydrophilic resin should be from 5 to 40% in order to obtain the required electrodeposition suitability, resulting in impaired anticorrosive properties, and that the solvent to be used is limited (to dibenzyl alcohol), which is disadvantageous from economical and other standpoints. Also disclosed is a technique of incorporating an electrically conductive pigment or a metal. This technique, however, is defective in that since relatively coarse particles such as a metal powder, zinc dust, or metal carbide are incorporated as the additive, a coated film formed from the coating composition not only makes an electrodeposited film formed thereon have considerable surface roughness, i.e., poor surface smoothness, but also has insufficient suitability for press forming.

As described above, the conventional techniques are still far from attaining well balanced coated film performances. If the incorporation of such a silica, hydrophilic resin, electrically conductive pigment, etc., even in relatively small amounts is effective in obtaining electrodeposition suitability, this method is more practical because various techniques can be employed more easily, such as alteration of base resins, incorporation of hardeners and rust preventives, and selection of such additives from wider ranges.

SUMMARY OF THE INVENTION

Accordingly, an object of the present invention is to provide colloidal particles of a high-purity silica or aluminum silicate which particles do not reaggregate into coarser particles.

Another object of the present invention is to provide a water-based coating composition having excellent anticorrosive properties.

Still another object of the present invention is to provide a water-based coating composition which can impart electrodeposition suitability required for electrodeposition and is excellent in film performances such as press processing suitability, spot weldability, rust-preventive property, anticorrosive property after electrodeposition, and secondary adhesion.

The present inventors made intensive studies on a novel colloidal particle dispersion of fumed silica or aluminum silicate (hereinafter called "colloidal particle dispersion") and water-based coating composition in order to attain the above-described objects. The first point which has been found as a result is that when the large anions possessed by a colloidizing agent (aid) are added to an aqueous solution containing a silica, based on the fact that the large anions in water act as an electron donor to the silanol groups present on the surfaces of the primary particles of silica or aluminum silicate, while the hydrogen atoms of the silanol groups that are forming hydrogen bonds act as a strong electron acceptor to the large anions possessed by the colloidizing agent (aid); the hydrogen bonds present between the primary particles of silica or aluminum silicate can be partly cut to thereby convert the primary particles of a network structure into aggregated particles (colloidal particles) having smaller particle diameters and, in addition, the colloidal particles obtained neither turn into coarser aggregates nor return to particles of a network structure even when allowed to stand, because the large anions are adsorbed onto the hydrogen atoms of silanol groups present on the surfaces of the aggregated particles and the adsorbed anions electrically repel one another.

The second point which has been found is that when colloidal particles having the ability to exchange weakly acidic cations are added for the purpose of imparting anticorrosive properties, a water-based coating composition can be obtained which is capable of forming a highly anticorrosive Coated film which can prevent the permeation of chlorine ions therethrough even in a severe corrosive environment (for example 5% aqueous sodium chloride solution).

The third point which has been found is that when a melamine cyanurate compound is incorporated in a slight amount into the water-based coating composition described above, good electrodeposition suitability is obtained, and that the density of sites usable for current application can be controlled by varying the content of the melamine cyanurate compound. The incorporation of the melamine cyanurate compound was based on a notion that since the nitrogen atoms in the melamine cyanurate compound, which has a plane structure, are electron-donative (cationic) and are vibrating up and down in the molecule, they can be reversely charged by counter charges approaching thereto and by the vibration and, hence, can serve as effective sites for current application in electrodeposition coating.

The present invention has been completed based on the findings described above.

The first object of the present invention can therefore be accomplished with (1) a colloidal particle dispersion comprising mainly (i) a fumed silica or fumed aluminum silicate, (ii) a colloidizing agent (aid) which is at least one compound selected from the group consisting of a phosphoric acid compound, a molybdic acid compound, a boric acid compound, .and a silicic acid compound, and (iii) water.

The other objects of the present invention can be accomplished with (2) a water-based coating composition which contains the colloidal particle dispersion as described in item (1) above.

The other objects of the present invention can be accomplished also with (3) a water-based coating composition as described in item (2) above which further contains a melamine cyanurate.

DETAILED DESCRIPTION OF THE INVENTION

The colloidal particle dispersion according to the present invention comprises mainly (i) a fumed silica or fumed aluminum silicate, (ii) a colloidizing agent (aid) which is at least one compound selected from the group consisting of a phosphoric acid compound, a molybdic acid compound, a boric acid compound, and a silicic acid compound, and (iii) water.

The fumed silica or fumed aluminum silicate, as a major component of the colloidal particle dispersion, is not particularly limited as long as it is one produced by the fuming process. However, since the incorporation of a high-purity silica or aluminum silicate is preferred for the prevention of the permeation of chlorine ions through film in a corrosive atmosphere (for example 5% aqueous sodium chloride solution), it is preferable that the fumed silica or aluminum silicate be a high-purity one containing no impurity ions. Particularly, a high-purity aluminum silicate is preferred.

Preferred examples of the fumed silica include AEROSIL 200, AEROSIL 300, and AEROSIL 380, all manufactured by Nippon Aerosil K. K. Preferred examples of the fumed aluminum silicate include AEROSIL MOX170, AEROSIL MOX80, and AEROSIL COK84, all manufactured by Nippon Aerosil K. K. Of these, AEROSIL MOX170 which is an aluminum silicate is advantageous over AEROSIL 200 which is a silica alone, because the former AEROSILs can be more efficiently colloidized and the colloidal particle dispersions produced therefrom do not gel even when any of the polyacids or the like which will be described later was used as the colloidizing agent (aid).

The amount of the fumed silica or fumed aluminum silicate to be incorporated is preferably from 50 to 200 parts by weight, more preferably from 100 to 150 parts by weight, per 1,000 parts by weight of the total amount of water and the fumed silica or fumed aluminum silicate. Incorporated amounts of less than 50 parts by weight are undesirable in that not only the colloidal particles obtained are apt to reaggregate, but also a water-based coating composition containing the colloidal particles gives a coated film having impaired anticorrosive properties. Incorporated amounts of more than 200 parts by weight are undesirable in that a water-based coating composition containing the colloidal particles obtained tends to give a coated film having impaired anticorrosive properties.

The colloidizing agent (aid) as another major component of the colloidal particle dispersion is not particularly limited as long as it is a compound which forms large anions in an aqueous solution. Examples thereof include phosphoric acid compounds such as condensed phosphoric acids, e.g., pyrophosphoric acid, tripolyphosphoric acid, tetrapolyphosphoric acid, pentapolyphosphoric acid, hexapolyphosphoric acid, heptapolyphosphoric acid, octapolyphosphoric acid, nonapolyphosphoric acid, decapolyphosphoric acid, metaphosphoric acid, trimetaphosphoric acid, hexametaphosphoric acid, and ultrapolyphosphoric acid, and the ammonium salts of these acids.

Preferred of these are metaphosphoric acid, hexametaphosphoric acid, and the ammonium salts thereof.

Although the alkali metal salts and alkaline earth metal salts of those phosphoric acid compounds also exist, the inclusion of metal ions into the colloidal particle dispersion produces a fatal effect on the anticorrosive properties of a coated film to be formed from a water-based coating composition containing the dispersion. That is, the presence of metal ions in a coated film accelerates the permeation of halogen ions (Cl$^-$) through the film in a corrosive atmosphere and deprives the cation exchange ability of the silica and, as a result, the anticorrosive properties are considerably reduced. For this reason, use of an alkali metal salt or an alkaline earth metal salt is undesirable.

Besides the phosphoric acid compounds, examples of the colloidizing agent (aid) further include molybdic acid compounds such as ammonium molybdate tetrahydrate, boric acid compounds such as ammonium pentaborate and metaboric acid, and silicic acid compounds such as orthosilicic acid and metasilicic acid. However, since the silicic acids are only slightly soluble in water, they should be used after being dissolved in an ammoniacal alkaline solution. Further, although a sulfur-containing anion is chemically active in an oxidation-reduction reaction, it is also usable as a colloidizing agent (aid).

As examples of the colloidizing agent (aid), polyacids and ammonium salts thereof were enumerated above which form large anions in an aqueous solution. With respect to part of those compounds, the chemical structures are shown in Ex. 1 to Ex. 5 below.

Ex. 1 Tetrametaphosphoric acid (HPO$_3$)$_4$, forming a cyclic anion.

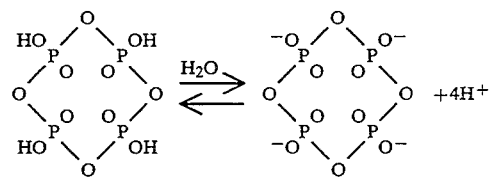

Ex. 2 Polyphosphoric acid (H$_{n-2}$P$_n$O$_{3n+1}$), forming a chain anion.

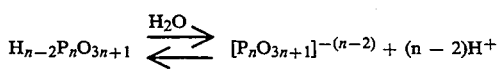

Ex. 3 Trimetaboric acid $(HBO_2)_3$, forming a cyclic anion.

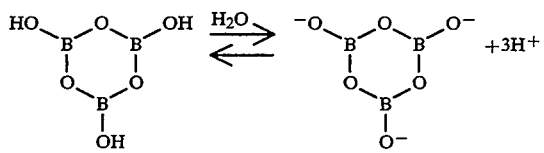

Ex. 4 Hexametaboric acid $(HBO_2)_6$, forming a chain anion.

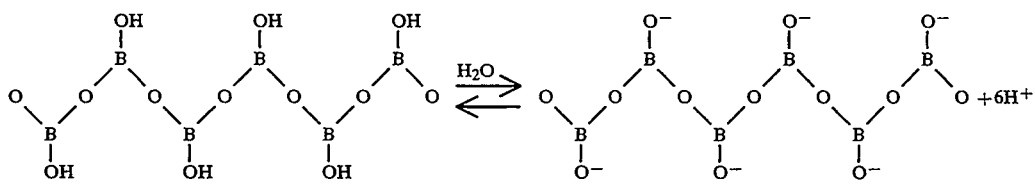

Ex. 5 Orthosilicic acid $(H_2SiO_4)$, forming a cyclic anion (orthosilicic acid in aqueous solution is present in the form of a tetramer).

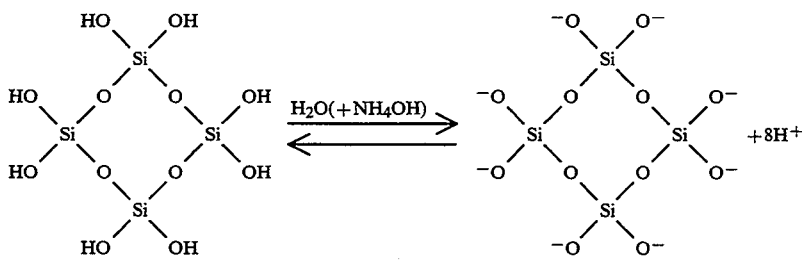

The colloidizing agent (aid) described above thus forms large anions in an aqueous solution and thereby is an effective means for effectively cutting hydrogen bonds of the above-described fumed silica or fumed aluminum silicate (e.g., AEROSIL 300) having a silanol group density of from 3 to 6 per $nm^2$ to obtain the finely divided particles. Since the anions are adsorbed onto silanol groups of the fumed silica or aluminum silicate, the finely divided colloidal particles can be prevented from reaggregating due to electrical repellency among the adsorbed anions. Use of monovalent anions is undesirable because a monovalent anion acts on only one silanol group and is hence not so effective in converting coarse aggregates, consisting of primary particles linked into chains by the formation of many hydrogen bonds, into finer colloidal particles (aggregated particles).

The amount of the colloidizing agent (aid) to be added is not particularly limited, and may be varied according to the desired particle diameter of the colloidal particles to be obtained. For example, in the case where colloidal particles having a particle diameter of 500 nm or less are to be produced, the colloidizing agent (aid) is added in an amount in the range of preferably from $2 \times 10^{-4}$ to $2 \times 10^0$ mol, more preferably from $2 \times 10^{-3}$ to $2 \times 10^{-2}$ mol, per mol of the silica or aluminum silicate. If the amount of the colloidizing agent (aid) added is less than $2 \times 10^{-4}$ mol, the colloidal particles obtained disadvantageously aggregate readily and return to coarser particles of a network structure. If the amount thereof is more than $2 \times 10^0$ mol, a water-based coating composition containing the colloidal particles obtained tends to disadvantageously give a coated film having impaired anticorrosive properties.

The water as still another major component of the colloidal particle dispersion preferably is one having a low impurity content, such as, for example, ion-exchanged water or pure water.

The amount of the water to be incorporated is preferably from 800 to 950 parts by weight, and more preferably from 850 to 900 parts by weight, per 1,000 parts by weight of the total amount of the water and the fumed silica or fumed aluminum silicate.

Although the colloidal particle dispersion of the present invention contains the above-described major components, i.e., fumed silica or fumed aluminum silicate, a colloidizing agent (aid) which is at least one compound selected from the group consisting of a phosphoric acid compound, a molybdic acid compound, a boric acid compound, and a silicic acid compound, and water, optional ingredients including a thickening agent may be suitably added if desired.

Methods for producing the colloidal particle dispersion comprising the above-described components are not particularly limited. However, since the recently popular method for producing a colloidal particle having good long-term stability by incorporating a core-shell type water-based emulsion (resin) is defective in that the emulsion may be destroyed by stirring shear, it is desirable to produce the colloid using a weak stirring force, more preferably without incorporating the emulsion. In an example of such preferred method, an aqueous solution containing fumed silica is stirred to form coarse aggregates and a polyacid solution (colloidizing agent (aid)) is then added thereto with further stirring to thereby effectively destroy hydrogen bonds of the coarse aggregates and convert the aggregates into colloidal particles (aggregated particles) having a smaller particle diameter. In this method, the anions of the water-soluble colloidizing agent (aid) are adsorbed onto the hydrogen atoms of silanol groups and the colloidal particles formed constitute a stable colloid due to electrical repellency among the adsorbed anions. Consequently, the colloidal particles return to neither coarse aggregates nor particles of a network structure even when allowed to stand.

By controlling the amount of the colloidizing agent (aid) to be added or by controlling other conditions, the colloidal particles to be thus obtained can have the desired particle diameter. For example, in the case where the colloid is to be used as an ingredient for a water-based coating composition for forming the organic coated film of a highly corrosion-resistant precoated steel sheet, the desired colloidal particle diameter is preferably in the range of 500 nm or less, more preferably in the range of from 150 to 250 nm, and most preferably in the range of from 150 to 200 nm.

The water-based coating composition of the present invention is characterized by containing the colloidal particle dispersion described above. As a preferred embodiment, it further contains a melamine cyanurate.

The coating composition of the present invention is, hence, not particularly limited as long as it is a water-based coating composition containing the colloidal particle dispersion described above. Examples thereof include water-based coating compositions containing, as major components, resins which are, for example, water-soluble, water-dispersible, or emulsified ones or mixtures thereof.

As the water-soluble or water-dispersible resin component, any of the resins used for ordinary coating composition can be employed without particular limitations. The resin component may be anionic, cationic, amphoteric, or nonionic. Especially preferred examples thereof include water-soluble or water-dispersible resins, such as alkyd resins, polyester resins, epoxy resins, urethane resins, aminoplast resins, or maleic-oil resins. In the case where an anionic resin such as an acrylic or alkyd resin is employed as the resin component, the resin is neutralized with a basic compound such as ammonia, an alkylamine, or an alkanolamine to make the resin water-soluble, or is more partly neutralized with such a basic compound to make the resin water-dispersible. In the case of employing a cationic resin, it is neutralized with an acid compound to a desired degree for the same purpose. The thus-treated resin is dissolved or dispersed into water.

The emulsified resin component is one usually called a resin emulsion. Examples of the resin include vinyl acetate resins, acrylic resins, styrene-butadiene resins, vinyl chloride resins, epoxy resins, and urethane resins.

For emulsifying these resin components to produce aqueous emulsions, use of a nonionic emulsifying agent is preferred. However, a cationic or anionic emulsifying agent also may be used for resins having a cationic structural unit or for resins having an anionic structural unit, respectively. It is also possible to use a surfactant or a protective colloid such as poly(vinyl alcohol). Although resin emulsions can be prepared by suspending the resin components in water with the emulsifying agents such as the above ones, it is preferred to produce resin emulsions by the emulsion polymerization of the monomers. In this method, a resin component is emulsified into water with stirring; the emulsion is heated while nitrogen gas is kept being blown thereinto; an oxidation catalyst, such as benzoyl peroxide, a persulfate, or hydrogen peroxide, or a redox catalyst comprising a combination of such an oxidation catalyst and a reducing agent, such as sodium thiosulfate or sodium sulfite, is added to conduct emulsion polymerization; and a molecular weight regulator, pH regulator, antifoaming agent, etc., are added if desired to thereby obtain an aqueous emulsion.

Representative examples of the resin emulsion thus obtained include the following commercial products: epoxy emulsions such as EPORISION EA55 manufactured by Kanebo NSC K. K., Japan; and acrylic emulsions such as "ACRYSOL" 658, 604, 1533, 1822, 1561, 2045, and 1803 manufactured by Rohm & Haas Co., "WATERSOL" S-616, 4PW-77, S-717, S-695, and S-126 manufactured by Dainippon Ink & Chemicals, Inc., Japan, and "NIKASOL" SY1094, SY1095, SY991, and SY1176 manufactured by Nippon Carbide Industries Co., Inc., Japan.

A crosslinking agent which undergoes a crosslinking reaction with reactive groups of the resin component can be further incorporated to produce a thermosetting, water-based coating composition. It may be selected from ordinarily used crosslinking agents such as aminoplasts, blocked isocyanates, epoxy compounds, phenoplasts, and amines. The proportion of the thermosetting resin having a group reactive with the crosslinking agent to the crosslinking agent is preferably from 95/5 to 60/40, more preferably from 90/10 to 70/30, by weight.

It is preferable that a melamine cyanurate compound having a plane structure containing an isocyanuric ring be incorporated into the water-based coating composition of the present invention. When this coating composition is used for producing a precoated rust-proof steel sheet having a thin coated film, this compound imparts electrodeposition suitability required for electrodeposition coating and overcomes the unbalance among coated film performances which has accompanied conventional techniques.

The amount of the melamine cyanurate compound contained in the water-based coating composition is in the range of preferably from 0.05 to 25 parts by weight, more preferably from 0.5 to 6 parts by weight, per 100 parts by weight of the solid components of the composition.

The melamine cyanurate compound for use in the present invention is a compound represented by the following chemical formula $(C_6H_9N_9O_3)_n$ and, specifically, is an equimolar addition compound of 2,4,6-triamino-1,3,5-triazine (hereinafter referred to as melamine) with 2,4,6-trihydroxy-1,3,5-triazine (hereinafter referred to as cyanuric acid) and/or its tautomer. It is presumed that, in a solid state, melamine molecules and cyanuric acid molecules are alternately linked to each other through weak hydrogen bonds to form a crystal having a plane structure as illustrated below.

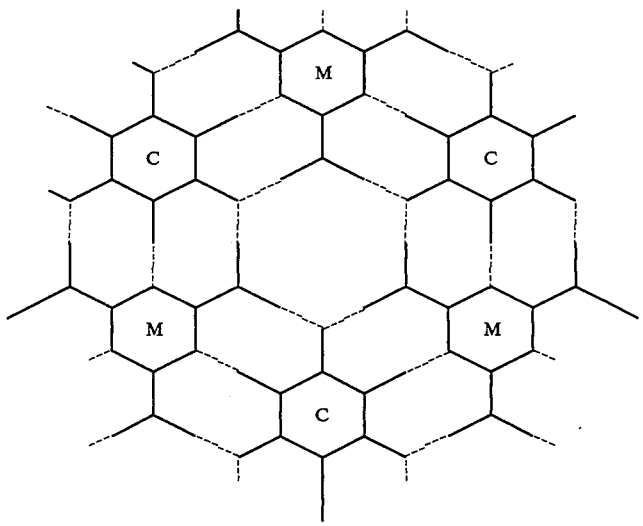

It is also presumed that the stereostructure is a stacked-plane structure having a constant plane spacing, i.e., the so-called graphite-type structure, as illustrated below.

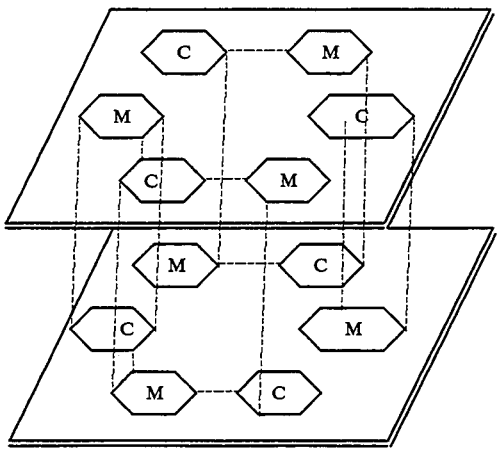

In the two illustrations given above, C represents a cyanuric acid molecule and M represents a melamine molecule.

The melamine cyanurate compound can be obtained by the process described in U.S. Pat. No. 4,180,496 (corresponding to JP-B-60-33850). (The term "JP-B" as used herein means an "examined Japanese patent publication".) The compound is on the market as MC series (MC-FW, MC-PW, MC-BW, MC-UW, MC-420, MC-520, MC-600, etc.), which are manufactured by Nissan Chemical Industries, Ltd. Although the technique of incorporating a melamine cyanurate into a clear layer in the metallic coating of an automotive body or other substrate to produce a pearly luster like mica coating has been well known, this technique is entirely different from the present invention in function and effect.

This melamine cyanurate compound is so stable that it has good resistance to acids and alkalis and undergoes no chemical change in a pH range of from 1 to 14. This means that the water-based coating composition of the present invention which contains the melamine cyanurate compound has the effect of preventing the base metal/coating interface from having impaired adhesion due to electrical load in cationic electrodeposition, during which the substrate for the electrodeposited film is exposed to a pH of about 12.

The melamine cyanurate compound is only sparingly soluble in water and is heat-resistant. It is insoluble also in organic solvents for ordinary coating use; its solubility in dimethyl sulfoxide is as low as 0.011 g/100ml at 70° C. This means that the compound does not dissolve into the water infiltrated into the coated film during electrodeposition coating and hence does not inhibit the electrodeposition.

Into the water-based coating composition of the present invention, the pigments and additives which will be mentioned below and other ingredients can be incorporated as optional ingredients.

Examples of rust-preventive pigments for primer-use that are usable in the present invention include zinc chromate, strontium chromate, calcium chromate, barium chromate, magnesium chromate, red lead, lead suboxide, basic lead chromate, lead cyanamide, calcium plumbate, zinc phosphate, aluminum phosphate, calcium phosphate, and mixtures of zinc metal powder and glass flake powder.

Examples of extender pigments that are usable in the present invention include calcium carbonate, gypsum, clay, and talc.

Examples of solvents that are usable in the present invention include water and mixtures of water and one or more of such hydrophilic organic solvents such as alcohols, e.g., methyl alcohol, ethyl alcohol, isopropyl alcohol, butyl alcohol, isobutyl alcohol, 2-butyl alcohol, benzyl alcohol, and cyclohexanol, and ketones, e.g., acetone, methyl ethyl ketone, methyl isobutyl ketone, cyclohexanone, isophorone, and diacetonalcohol. The amount of the solvent to be added is as follows. The amount of water is from 50 to 80% by weight based on the amount of the water-based coating composition, while the amount of a mixture of a hydrophilic organic solvent and water is from 50 to 80% by weight based on the amount of the water-based coating composition, provided that a ratio of water/solvent (by weight) is 100 to 20/0 to 80. It is preferable that the solvent content be regulated so that the solid content of the water-based coating composition is from 20 to 50% by weight at the time of the production of the composition and is from 10 to 20% by weight at the time of coating.

In the water-based coating composition of the present invention, most preferably a ratio of the water-based coating composition (solid composition)/solvent is (20 to 50)/(80 to 50) by weight, and in the solid component of water-based coating composition, a ratio of a resin/colloidal particle/melamine cyanurate is (55 to 85)/(10 to 40)/(0 to 5) by weight, and further a ratio of a functional resin capable of reacting with a crosslinking agent/the crosslinking agent is 90/10 to 75/25. Furthermore, it is preferred that the above functional resin is an epoxy resin emulsion.

Examples of additives that are usable in the present invention include anti-foaming agents, leveling agents, crawling (cissing) inhibitors, gloss agents, suspending agents, wetting agents (surfactants), lubricants, antiseptics, and mildew-proofing agents.

Of the above ingredients, the amount of the pigment to be incorporated in the water-based coating composition is preferably regulated in the range of from 0.5 to 30 parts by weight per 100 parts by weight of the solid resin component of the composition.

For mixing the ingredients, a device ordinarily used for the production of coating compositions is employed such as a ball mill, sand-grinding mill, or dissolver. Water is used as a medium to adjust the viscosity. Along with the water, a hydrophilic organic solvent can be used in such an amount as not to destroy the emulsion.

The incorporation of colloidal particles into the water-based coating composition is conducted either during the production of the coating composition (premixing) or after the completion of the production (postmixing). The amount thereof (solid content) is in the range of preferably from 15 to 60 parts by weight, more preferably from 20 to 40 parts by weight, on a solid basis per 100 parts by weight of the resin component of the water-based coating composition. If the amount of the colloidal particles incorporated is less than 15 parts by weight, poor anticorrosive properties result. Amounts thereof exceeding 60 parts by weight are undesirable because the viscosity of the water-based coating composition becomes so high that difficulties are encountered in the production process, and because a roping phenomenon occurs in the roll-coating application of the coating composition due to the excessive pickup of the composition, resulting in the necessity of dilution.

For incorporating colloidal particles into the water-based coating composition, a dispersion mixer is used such as a ball mill, sand-grinding mill, or dissolver as in the mixing step described above.

It is advantageous that before the application of the water-based coating composition of the present invention on a metal sheet, the substrate be subjected to a pretreatment in order to make the substrate rust-proof and to improve the adhesion of the coating composition. Generally employed as the pretreatment is a degreasing treatment such as, for example, washing with an acid or alkali. In another pretreatment, such a degreasing treatment is followed by a chemical treatment using a chemical solution such as a phosphate or chromate solution. In particular, it is known that by conducting such pretreatments in series, coated films excellent in both adhesion and rust-preventive property can be formed stably.

On the substrate which has undergone the pretreatment, the water-based coating composition of the present invention is applied at a dry film thickness of 0.2 to 5 $\mu$m (hereinafter thickness means dry film thickness). The coated film may be coated by either of the following methods (A) and (B) according to need.

(A) It is desirable that undercoating (primer coating) be conducted on the coated film formed from the water-based coating composition of the present invention. The primer coating serves to protect the substrate against corrosion and imparts adhesion to the metal sheet surface, the film deposited by surface treatment, and a topcoated film. The thickness of the undercoated film is usually from 1 to 7 $\mu$m. Baking is carried out within a short time period under temperature and time conditions optimum for the coating resin used.

Topcoating is conducted preferably at a thickness of 7 to 20 $\mu$m. If the topcoated film thickness is less than 7 $\mu$m, the film has insufficient coloring power and is, hence, unable to hide the undercoated film. If the thickness thereof is more than 20 $\mu$m, there is a fear that the coated film may generate pinholes in high-temperature, short-time baking. With respect to the temperature and time for the baking, the optimum conditions for the topcoating used are selected.

(B) Cationic or anionic electrodeposition coating (dry film thickness: 15–40 $\mu$m) is conducted on the coated film formed from the water-based coating composition of the present invention. If desired, the electrodeposition coating is followed by the application of an intermediate-coating of the alkyd resin, polyester resin, or acrylic resin type (dry film thickness: 20–60 $\mu$m), and then by the application of a topcoating of the acrylic resin, polyester resin, or fluororesin type as the conventional topcoating for automobiles.

Coating systems that can be used in combination with the coated film formed from the water-based coating composition of the present invention are not limited to the above-described ones, and the type of resin may be any of the organic solvent-based type, water-based type, and powder type.

Methods for applying the water-based coating composition are not particularly limited, and use can be made of ordinary coating techniques such as air spray coating, airless spray coating, and electrostatic coating. In the case where the precision of coating thickness, smoothness of coating surface, or the like is especially demanded, it is preferred to employ such a coating technique as gravure coating, roll coating, curtain coating, bar coating, or offset gravure coating.

The present invention will be explained below in more detail by reference to the following examples, but the present invention is not construed as being limited thereto.

EXAMPLE 1

To ion-exchanged water was added, with stirring (2,000 rpm), each of various grades of fumed silica or fumed aluminum silicate (AEROSIL 200, 300, 380, MOX170, and MOX80; all manufactured by Nippon Aerosil K. K.; nonvolatile content 100%; the same applies hereinafter). To each of the resulting solutions was gradually added each colloidizing agent (aid) (metaphosphoric acid (n=3), ammonium hexametaphosphate, hexametaphosphoric acid (n=6), metaboric acid (n=3–6), or ammonium borate) in such an amount that the proportion of ion-exchanged water/fumed silica or fumed aluminum silicate/colloidizing agent (aid) was 870 (by weight)/130 (by weight)/$4 \times 10^{-3}$ (by mol). After addition of the colloidizing agents (aids), the mixtures each was further stirred for 30 minutes under the same stirring conditions to thereby obtain desired colloidal particle dispersions.

The long-term stability of each of the dispersions obtained was examined by measuring the colloidal-particle diameter using LPA 3000 (manufactured by Otsuka Densi) utilizing the dynamic light scattering method (laser light scattering method), at room temperature over a period of 180 days from just after the production. The results obtained are shown in Table 1.

tions was gradually added each colloidizing agent (aid) (metaboric acid (n=3−6), hexametaphosphoric acid (n=6), or ammonium borate) in such an amount that the proportion of ion-exchanged water (by weight)/fumed silica or fumed aluminum silicate (by weight)/colloidizing agent (aid) (by mol) was shown in Table 2. Samples as a comparative example to which no colloidizing agent (aid) was added were also prepared. After addition of the colloidizing agent (aid), the mixtures each

TABLE 1

Change of colloidal particle diameter with the lapse of time

| Kind of colloidizing agent (aid) | Lapse of time | Colloidal-Particle Diameter (nm) | | | | |
|---|---|---|---|---|---|---|
| | | AEROSIL 200 | AEROSIL 300 | AEROSIL 380 | AEROSIL MOX170 | AEROSIL MOX80 |
| Metaphosphoric acid (n = 3) | just after | 250 | 220 | 240 | 220 | 250 |
| | 60 days | (300) | (300) | (350) | 220 | 250 |
| | 120 days | (300) | (300) | (350) | 220 | 250 |
| | 180 days | (300) | (300) | (350) | 220 | 250 |
| Ammonium hexametaphosphoric acid | just after | (240) | (250) | (300) | 220 | 250 |
| | 60 days | (300) | (300) | (380) | 220 | 250 |
| | 120 days | (300) | (350) | (400) | 220 | 250 |
| | 180 days | (300) | (400) | (400) | 260 | 260 |
| Hexametaphosphoric acid (n = 6) | just after | 240 | (250) | 300 | 220 | 220 |
| | 60 days | (260) | (300) | (350) | 220 | 220 |
| | 120 days | (260) | (300) | (350) | 220 | 220 |
| | 180 days | (260) | (300) | (350) | 260 | 240 |
| Metaboric acid (n = 3-6) | just after | 250 | 220 | 240 | 220 | 250 |
| | 60 days | 250 | 220 | 240 | 220 | 250 |
| | 120 days | 250 | 220 | 240 | 220 | 250 |
| | 180 days | 250 | 220 | 240 | 220 | 250 |
| Ammonium borate | just after | 250 | 220 | (230) | 220 | 250 |
| | 60 days | (250) | (230) | (250) | 220 | 250 |
| | 120 days | (250) | (230) | (250) | 220 | 250 |
| | 180 days | (250) | (230) | (250) | 220 | 250 |

Note) The values in the parentheses were determined after 5-minute stirring with a disper (2,000 rpm) because the colloidal dispersions had structural viscosity.

It was ascertained from the results in Table 1 that the metaboric acid is preferred as a colloidizing agent (aid) capable of forming colloidal silica dispersions and colloidal aluminum silicate dispersions which all do not gel and are stable in particle diameter. The metaboric acid $(HBO_2)_n$ is a mixture (n is 3 to 6) forming cyclic and chain anions in water, and it is thought that these structures contribute to the stabilization of the colloidal particle dispersions.

EXAMPLE 2 (including comparative example)

To ion-exchanged water was added, with stirring (2,000 rpm), each of various grades of fumed silica or fumed aluminum silicate (AEROSIL 200, 300, 380, MOX170, and MOX80). To each of the resulting soluwas further stirred for 30 minutes under the same stirring conditions to thereby obtain desired colloidal particle dispersions. (In the case of the samples as a comparative example containing no colloidizing agent (aid), stirring was further continued, after the addition of the various grades of fumed silica or fumed aluminum silicate, for 30 minutes under the same stirring conditions to thereby obtain desired colloidal particle dispersions.)

The long-term stability of each of the dispersions obtained was examined by measuring the colloidal-particle diameter using LPA 3000 (manufactured by Otsuka Densi) utilizing the dynamic light scattering method (laser light scattering method), over a period of 180 days from just after the production. The results obtained are shown in Table 2.

TABLE 2

Change of colloidal particle diameter with the lapse of time

| Kind of colloidizing agent (aid) | Ratio of H₂O (by weight)/silica (by weight)/colloidizing agent (aid) (by mol) | Lapse of time | Colloidal Particle Diameter (nm) | | | | |
|---|---|---|---|---|---|---|---|
| | | | AEROSIL 200 | AEROSIL 300 | AEROSIL 380 | AEROSIL MOX170 | AEROSIL MOX80 |
| Metaboric acid (n = 3-6) | $800/200/4 \times 10^{-3}$ | just after | 250 | 220 | 240 | 220 | 250 |
| | | 60 days | 250 | 220 | 240 | 220 | 250 |
| | | 120 days | 250 | 220 | 240 | 220 | 250 |
| | | 180 days | 250 | 220 | 240 | 220 | 250 |
| Hexametaphosphoric acid (n = 6) | $800/200/4 \times 10^{-3}$ | just after | 240 | (250) | (300) | 220 | 220 |
| | | 60 days | (260) | (300) | (350) | 220 | 220 |
| | | 120 days | (260) | (300) | (350) | 220 | 220 |
| | | 180 days | (260) | (300) | (350) | 260 | 240 |
| Ammonium phosphate | $950/50/4 \times 10^{-3}$ | just after | 250 | 220 | (230) | 220 | 250 |
| | | 60 days | (250) | (230) | (250) | 220 | 250 |
| | | 120 days | (250) | (230) | (250) | 220 | 250 |
| | | 180 days | (250) | (230) | (250) | 220 | 250 |
| None (comparison) | — | just after | 2,000 | 2,500 | 3,000 | 2,000 | 2,000 |
| | | 1 day | 4,000 | 4,500 | 5,000 | 4,000 | 4,000 |
| | | 2 days | unable to be measured | | | | |

TABLE 2-continued

| Kind of colloidizing agent (aid) | Ratio of H$_2$O (by weight)/silica (by weight)/colloidizing agent (aid) (by mol) | Lapse of time | Colloidal Particle Diameter (nm) | | | | |
|---|---|---|---|---|---|---|---|
| | | | AEROSIL 200 | AEROSIL 300 | AEROSIL 380 | AEROSIL MOX170 | AEROSIL MOX80 |
| | | 3 days | unable to be measured | | | | |

Note) The values in the parentheses were determined after 5-minute stirring with a disper (2,000 rpm) because the colloidal dispersions had structural viscosity.

It was ascertained from the results in Table 2 that in the case of the samples as a comparative example containing no colloidizing agent (aid), the aggregated particles formed by stirring readily return to coarser particles of a network structure.

EXAMPLE 3

To ion-exchanged water was added, with stirring (2,000 rpm), each of various grades of fumed silica or fumed aluminum silicate (AEROSIL 300, 380, and MOX170). To each of the resulting solutions was gradually added a colloidizing agent (aid) (metaboric acid (n=3−6)) in such amounts that the proportion of ion-exchanged water/fumed silica or fumed aluminum silicate/colloidizing agent (aid) was 870 (by weight)/130 (by weight)/$1\times10^{-3}$ to $2\times10^0$ (by mol). After addition of the colloidizing agent (aid), the mixtures each was further stirred for 30 minutes under the same stirring conditions to thereby obtain desired colloidal particle dispersions.

The relationship between colloidal-particle diameter and the amount of the colloidizing agent (aid) added was examined by measuring the colloidal-particle diameter just after the production using LPA 3000 (manufactured by Otsuka Densi) utilizing the dynamic light scattering method (laser light scattering method). The results obtained are shown in Table 3.

TABLE 3

Relationship between colloidal particle diameter and colloidizing agent (aid) amount

| Kind of colloidizing agent | Amount of colloidizing agent (aid) (mol) | Colloidal Particle Diameter (nm) | | |
|---|---|---|---|---|
| | | AEROSIL 300 | AEROSIL 380 | AEROSIL MOX170 |
| Metaboric acid (n = 3-6) | $1 \times 10^{-3}$ | 500 | 500 | 400 |
| | $2 \times 10^{-3}$ | 400 | 400 | 350 |
| | $3 \times 10^{-3}$ | 350 | 350 | 300 |
| | $4 \times 10^{-3}$ | 220 | 240 | 250 |
| | $6 \times 10^{-3}$ | 200 | 210 | 220 |
| | $8 \times 10^{-3}$ | 190 | 190 | 200 |
| | $1 \times 10^{-2}$ | 190 | 180 | 180 |
| | $2 \times 10^{-2}$ | 180 | 160 | 160 |
| | $3 \times 10^{-2}$ | 180 | 150 | 150 |
| | $4 \times 10^{-2}$ | 180 | 140 | 140 |
| | $6 \times 10^{-2}$ | 170 | 130 | 130 |
| | $8 \times 10^{-2}$ | 170 | 120 | 120 |
| | $1 \times 10^{-1}$ | 160 | 100 | 100 |
| | $2 \times 10^{-1}$ | 160 | 100 | 100 |
| | $3 \times 10^{-1}$ | 160 | 100 | 90 |
| | $4 \times 10^{-1}$ | 150 | 100 | 80 |
| | $6 \times 10^{-1}$ | 150 | 90 | 70 |
| | $8 \times 10^{-1}$ | 150 | 90 | 70 |
| | $1 \times 10^0$ | 140 | 70 | 70 |
| | $2 \times 10^0$ | 130 | 70 | 60 |

EXAMPLE 4 (including comparative example)

To ion-exchanged water was added, with stirring (2,000 rpm), each of various grades of fumed silica or fumed aluminum silicate (AEROSIL 300, 380, and MOX170). To each of the resulting solutions was gradually added each colloidizing agent (aid) (metaboric acid or metaphosphoric acid) in such amounts that the proportion of ion-exchanged water (by weight)/fumed silica or fumed aluminum silicate (by weight)/colloidizing agent (aid) (by mol) was 870/130/$1\times10^{-3}$ to $2\times10^0$. After addition of the colloidizing agents (aids), the mixtures each was further stirred for 30 minutes under the same stirring conditions to thereby obtain desired colloidal particle dispersions (I).

Subsequently, EPORISION EA55 (an aqueous emulsion of an epoxy resin; manufactured by Kanebo NSC K. K.; nonvolatile content, 55%; epoxy equivalent, about 950) was mixed with EPOCROS K1050E (manufactured by Nippon Shokubai Co., Ltd., Japan; nonvolatile content, 40%; the same applies hereinafter), with either each of the colloidal particle dispersions (I) or, as a comparative example, a wet (precipitated)-silica colloid (SNOWTEX N or SNOWTEX up, each manufactured by Nissan Chemical Industries, Ltd. and having a nonvolatile content of 20%; the same applies hereinafter), and with melamine cyanurate MC 101 (manufactured by Nissan Chemical Industries, Ltd.; nonvolatile content, 10%; the same applies hereinafter) in such a proportion that the weight ratio of EPORISION/EPOCROS/colloidal particle dispersion/melamine cyanurate was 65.6/9.4/20/5 on a solid basis. Thus, various kinds of water-based coating compositions (I) were prepared.

Each of the above water-based coating compositions (I) was applied with a bar coater on a steel sheet (0.8 mm) plated with zinc-nickel in which the steel sheet had undergone degreasing with trichlene. Baking was then conducted under conditions of a maximum temperature of 150° C. and an oven-pass time of 20 seconds to prepare test pieces (I) having a coated film thickness of 1.0 μm.

The thus-obtained various test pieces (I) were subjected to the following CCT-I test.

(A) CCT-I Test (Cyclic Corrosion Test)

(i) Saline Solution Spraying: Each of the test pieces was sprayed over a period of 4 hours with 5 mol % NaCl warmed to 35° C.

(ii) Drying: The test pieces sprayed with saline solution were then dried at 60° C. for 2 hours.

(iii) Moistening: The dry test pieces were then placed for 2 hours in a moist atmosphere having a humidity of 95% or higher and a temperature of 50° C.

Conducting the above treatments (i) to (iii) once was regarded as one cycle (the time required: 8 hours), and the treatments were repeated until a total of 200 cycles. In this CCT-I test, each of the resulting test pieces was evaluated in terms of the proportion of the surface which had generated a white rust, the proportion being expressed in % (the proportion for a test piece in which the whole surfaces had generated a white rust was 100%). The results obtained are shown in Table 4.

The test pieces (I) described above were further electrodeposition-coated with cationic electrodeposition coating paint POWER TOP U-600 GRAY (manufactured by Nippon Paint Co., Ltd.) under conditions of an electrodeposition voltage of 170 V, a pressure increase time of 30 seconds, and an electrodeposition time of 2 minutes and 30 seconds. The electrodeposited film was cured by baking it at 170° C. for 20 minutes, thereby giving test pieces.

(B) Examination of Electrodeposited film for Film State

Each electrodeposited film was examined for film state. The results obtained are shown in Table 4. The film states for the electrodeposited films were expressed by the following symbols.
- E: Excellent (the same film appearance as that of cold-rolled steel sheet directly or of cold-rolled steel sheet treated with zinc phosphate directly was obtained.)
- G: slight surface toughening was observed
- M: moderate surface roughening was observed
- B: considerable surface roughening with gas-caused pinholes was observed (C) Warm Saline Solution Immersion Test for Electrodeposited film Each electrodeposited film was crosswise incised at a depth reaching the steel substrate, and the resulting test piece was immersed for 10 days (240 hours) in 5 wt % aqueous NaCl solution warmed at 55° C. Thereafter, the test piece was taken out and dried. A 2.4 cm-wide pressure-sensitive cellophane tape was applied to the crosswise incised part and then stripped. The resulting peeled state of the electrodeposited film was evaluated by measuring the distance (mm) from the crosswise incised part over which distance the film had peeled off. The results obtained are shown in Table 4. Each found value indicates the maximum peel distance for both sides of the crosswise incised part.

(D) Warm Water Immersion Test for Electrodeposited film

Each electrodeposited film was crosshatch-wise incised at an interval of 1 mm at a depth reaching the steel substrate to make 100 squares, and the resulting test piece was immersed in 50° C. warm water for 20 days (480 hours). Thereafter, the test piece was taken out and dried. A 2.4 cm-wide pressure-sensitive cellophane tape was applied to the crosshatch-wise incised part and then stripped. The resulting peeled state of the electrodeposited film was evaluated in terms of the number of remaining squares. The numerator indicates the number of remaining squares; "100/100" means that no peeling occurred and the test piece was good in resistance to warm water immersion, while "0/100" means that all the squares had peeled off. The results obtained are shown in Table 4.

(E) Weldability Test

Each test piece was subjected to 5,000-spot welding using a single-spot welder under welding conditions of a welding current of 9,000 A, electrode pressure of 200 kg, electrode diameter of 5 mm, weld time of 10 cycles. The state of the welds was examined and the nugget was also examined for smearing. The results obtained are shown in Table 4. The state of welds and the nugget smearing are expressed by the following symbols.

| State of Welds | Nugget Smearing |
| --- | --- |
| G: no abnormality | no smearing |
| M: slightly warped | slight smearing |
| P: insufficient in welding depth | considerable smearing |
| —: unable to be welded (or unwelded) | |

EXAMPLE 5

Colloidal particle dispersions (I) were obtained in the same manner as in Example 4.

Subsequently, HITALOID 7800 (an aqueous emulsion of an acrylic-modified epoxy resin; manufactured by Hitachi Chemical Co., Ltd., Japan; nonvolatile content, 35%) was mixed with EPOCROS K1050E, each of the colloidal particle dispersions (I), and melamine cyanurate MC 101 in such a proportion that the weight ratio of HITALOID/EPOCROS/ colloidal particle dispersion/melamine cyanurate was 74.4/10.6/10/5 on a solid basis. Thus, various kinds of water-based coating compositions (II) were prepared.

Each of the above water-based coating compositions (II) was applied with a bar coater on a steel sheet (0.8 mm) plated with zinc-nickel in which the steel sheet had undergone degreasing with trichlene. Baking was then conducted under conditions of a maximum temperature of 150° C. and an oven-pass time of 20 seconds to prepare test pieces having a coated film thickness of 1.0 $\mu$m.

The thus-obtained various test pieces were subjected to the CCT-I test in the same manner as in Example 4. The results obtained are shown in Table 4. Electrodeposition coating was further conducted in the same manner as in Example 4, followed by the examination of the appearance of the electrodeposited films and by the warm saline solution immersion test, warm water immersion test, and weldability test. The results obtained are shown in Table 4.

EXAMPLE 6

Colloidal particle dispersions (I) were obtained in the same manner as in Example 4.

Subsequently, EPOMIK KR617 (an emulsion of an acrylic-modified epoxy resin; manufactured by Mitsui Petrochemical Industries, Ltd., Japan; nonvolatile content, 22%) was mixed with EPOCROS K1050E, each of the colloidal particles (I), and melamine cyanurate MC 101 in such a proportion that the weight ratio of EPOMIK/EPOCROS/colloidal particle dispersion/melamine cyanurate was 48.1/6.7/40/5 on a solid basis. Thus, various kinds of water-based coating compositions (III) were prepared.

Each of the above water-based coating compositions (III) was applied with a bar coater on a steel sheet (0.8 mm) plated with zinc-nickel which sheet had undergone degreasing with trichlene. Baking was then conducted under conditions of a maximum temperature of 150° C. and an oven-pass time of 20 seconds to prepare test pieces having a coated film thickness of 1.0 $\mu$m.

The thus-obtained various test pieces were subjected to the CCT-I test in the same manner as in Example 4. The results obtained are shown in Table 4. Electrodeposition coating was further conducted in the same manner as in Example 4, followed by the examination of the appearance of the electrodeposited films and by the warm saline solution immersion test, warm water immersion test, and weldability test. The results obtained are shown in Table 4.

EXAMPLE 7 (including comparative example)

The colloidal particle dispersion (I) was prepared in the same manner as in Example 4.

Subsequently, EPORISION EA55 (an aqueous emulsion of an epoxy resin; manufactured by Kanebo NSC K. K.; nonvolatile content, 55%; epoxy equivalent, about 950) was mixed with EPOCROS K1050E (manufactured by Nippon Shokubai Co., Ltd.; nonvolatile content, 40%) and either each of the colloidal particles (I) or, as a comparative example, a wet (precipitated)-silica colloid (SNOWTEX N or SNOWTEX up, each manufactured by Nissan Chemical Industries, Ltd. and having a nonvolatile content of 20%) in such a proportion that the weight ratio of EPORISION/EPOCROS/colloidal particle dispersion was 65.6/9.4/25 on a solid basis. Thus, various kinds of water-based coating compositions (IV) were prepared.

Each of the above water-based coating compositions (IV) was applied with a bar coater on a steel sheet (0.8 mm) plated with zinc-nickel which sheet had undergone degreasing with trichlene. Baking was then conducted under conditions of a maximum temperature of 150° C. and an oven-pass time of 20 seconds to prepare test pieces (IV) having a coated film thickness of 1.0 μm.

The thus-obtained various test pieces (IV) were subjected to the following CCT-I test. The results obtained are shown in Table 5.

EXAMPLES 8 TO 13

Examples 8 to 13 were carried out in the same manner as in Example 4, except that the resin, and amount thereof were changed as shown below. The results obtained are shown in Table 6.

It was ascertained from the results in Tables 4, 5 and 6 that the metaboric acid is preferred as a colloidizing agent (aid) suitable for forming a coated film having improved anticorrosive properties and that the amount of the colloidizing agent (aid) to be added is in the range of preferably from $2 \times 10^{-4}$ to $2 \times 10^{0}$ mol, more preferably from $2 \times 10^{-3}$ to $2 \times 10^{-2}$ mol.

| Example No. | Base resin/curing agent, Name of base resin/name of curing agent, producer's name in parentheses | Solid content of base resin and curing agent (parts by weight on a solid basis) | Weight ratio of base resin and curing agent | Content parts by weight on a solid basis MC101 | AEROSIL 300 | mol Metaboric acid |
|---|---|---|---|---|---|---|
| 8 | Aqueous epoxy emulsion/aliphatic amine, EPOLSION EA55 (Kanebo NSC K.K.)/ EPOLSION EB-1 (same as above) | 82 | 8/2 | 3 | 15 | $8 \times 10^{-3}$ (n = 3 to 6) |
| 9 | Aqueous epoxy emulsion/alicyclic amine, EPOLSION EA55 (Kanebo NSC K.K.)/ EPOLSION EB-10 (same as above) | 90 | 9/1 | 0 | 10 | $8 \times 10^{-3}$ (n = 3 to 6) |
| 10 | Aqueous epoxy emulsion/latent amine, EPOLSION EA55 (Kanebo NSO K.K.)/ EPOLSION HA-50 (same as above) | 87 | 9/1 | 3 | 10 | $8 \times 10^{-3}$ (n = 3 to 6) |
| 11 | Aqueous acryl emulsion/fatty amine, ME1200 (Nippon Paint K.K.)/ EPOLSION EB-1 (Kanebo NSC K.K.) | 82 | 8/2 | 3 | 15 | $8 \times 10^{-3}$ (n = 3 to 6) |
| 12 | Aqueous acryl emulsion/alicyclic amine, ME1200 (Nippon Paint K.K.)/ EPOLSION EB-10 (Kanebo NSC K.K.) | 77 | 9/1 | 3 | 20 | $8 \times 10^{-3}$ (n = 3 to 6) |
| 13 | Aqueous acryl emulsion/latent amine, ME1200 (Nippon Paint K.K.)/ EPOLSION HA-50 (Kanebo NSC K.K.) | 87 | 9/1 | 3 | 10 | $8 \times 10^{-3}$ (n = 3 to 6) |

The colloidal particle dispersion of the present invention is advantageous in that due to the use of a phosphoric acid compound, molybdic acid compound, boric acid compound, silicic acid compound, or the like, all of which have been newly found effective as a colloidizing agent (aid) for a fumed silica or aluminum silicate, colloidization can be carried out by stirring only, so that the step of pigment dispersion can be omitted and the time required for colloid production can hence be reduced greatly.

Further, since the colloidal particles according to the present invention are a colloid of fumed silica or fumed aluminum silicate, a coated film formed from a water-based coating composition containing the colloidal particles can have excellent anticorrosive properties.

A still another advantage is that the ordinary equipment currently in use can be used as it is.

Furthermore, the water-based coating composition containing a melamine cyanurate has an advantage, besides the above-described ones, that since the density of sites usable for current application in electrodeposition coating can be controlled by changing the amount of the melamine cyanurate compound to be incorporated, it can be utilized in a wide range of fields as a coating composition excellent in weldability, a coating composition for rust-proof steel sheets excellent in electrodeposition suitability, press processing suitability, spot weldability, rust resistance, corrosion resistance after electrodeposition, and secondary bondability, and as a water-based coating composition applicable to various substrates.

TABLE 4

| Kind of water-based coating composition | Kind of colloidizing agent (aid) | Amount of colloidizing agent (aid) (mol) | Proportion of white-rust area (%) [CCT-I, 200 cycles] AEROSIL 300 | AEROSIL 380 | AEROSIL MOX170 | Appearance of electrodeposited film AEROSIL 300 | AEROSIL 380 | AEROSIL MOX170 |
|---|---|---|---|---|---|---|---|---|
| Water-based coating composition (I) | Metaboric acid (n = 3 to 6) | $1 \times 10^{-3}$ | 50 | 40 | — | E | E | — |
| | | $2 \times 10^{-3}$ | 30 | 20 | — | E | E | — |

TABLE 4-continued

| | | | | | | | | |
|---|---|---|---|---|---|---|---|---|
| | | $4 \times 10^{-3}$ | 10 | 5 | — | E | E | — |
| | | $6 \times 10^{-3}$ | 10 | 5 | — | E | E | — |
| | | $8 \times 10^{-3}$ | 10 | 5 | — | E | E | — |
| | | $2 \times 10^{-2}$ | 40 | 30 | — | E | E | — |
| | | $4 \times 10^{-2}$ | 30 | 20 | — | E | E | — |
| | | $2 \times 10^{-1}$ | 30 | 20 | — | G | E | — |
| | | $1 \times 10^{2}$ | 20 | 15 | — | G | G | — |
| | | $2 \times 10^{1}$ | 10 | 10 | — | G | G | — |
| | Metaphosphoric acid | $1 \times 10^{-3}$ | 70 | 60 | — | G | G | — |
| | | $8 \times 10^{-3}$ | 45 | 40 | — | G | G | — |
| | | $2 \times 10^{-3}$ | 60 | 70 | — | G | G | — |
| | | $4 \times 10^{-2}$ | 30 | 35 | — | G | G | — |
| | | $2 \times 10^{-1}$ | 30 | 35 | — | M | M | — |
| | | $1 \times 10^{0}$ | 25 | 40 | — | M | M | — |
| | | $2 \times 10^{0}$ | 15 | 15 | — | M | M | — |
| Water-based coating composition (I) | Metaboric acid (n = 3 to 6) | $4 \times 10^{-3}$ | — | — | 10 | — | — | E |
| | | $4 \times 10^{-2}$ | — | — | 20 | — | — | E |
| Water-based coating composition (II) | Metaboric acid (n = 3 to 6) | $1 \times 10^{-3}$ | 50 | 40 | — | E | E | — |
| | | $2 \times 10^{-2}$ | 30 | 20 | — | E | E | — |
| | | $4 \times 10^{0}$ | 15 | 15 | — | E | E | — |
| | Metaphosphoric acid | $2 \times 10^{-3}$ | 60 | 55 | — | M | M | — |
| | | $2 \times 10^{-2}$ | 30 | 30 | G | G | — | — |
| | | $4 \times 10^{0}$ | 20 | 15 | — | M | M | — |
| Water-based coating composition (III) | Metaboric acid (n = 3 to 6) | $1 \times 10^{-3}$ | 50 | 40 | — | E | E | — |
| | | $2 \times 10^{-2}$ | 30 | 20 | — | E | E | — |
| | | $4 \times 10^{0}$ | 20 | 15 | — | E | E | — |
| | Metaphosphoric acid | $2 \times 10^{-3}$ | 65 | 55 | — | G | G | — |
| | | $3 \times 10^{-2}$ | 35 | 30 | — | M | M | — |
| | | $4 \times 10^{0}$ | 20 | 15 | — | M | M | — |

| | | Proportion of white-rust area (%) | | |
|---|---|---|---|---|
| | Kind of precipitated silica colloid[1] | 50 cycles | 100 cycles | Appearance of electrodeposited film |
| Water-based coating composition (I) (comparison) | SNOWTEX N | 50 | 100 | E |
| | SNOWTEX up | 20 | 95 | E |

| Kind of water-based coating composition | Kind of colloidizing agent (aid) | Amount of colloidizing agent (aid) (mol) | Immersion in warm saline solution [peeled width (mm)] | | | Immersion in warm water [number of remaining squares per 100] | | |
|---|---|---|---|---|---|---|---|---|
| | | | AEROSIL 300 | AEROSIL 380 | AEROSIL MOX170 | AEROSIL 300 | AEROSIL 380 | AEROSIL MOX170 |
| Water-based coating composition (I) | Metaboric acid (n = 3 to 6) | $1 \times 10^{-3}$ | 5 | 5 | — | 100 | 100 | — |
| | | $2 \times 10^{-3}$ | 0 | 0 | — | 100 | 100 | — |
| | | $4 \times 10^{-3}$ | 0 | 0 | — | 100 | 100 | — |
| | | $6 \times 10^{-3}$ | 0 | 0 | — | 100 | 100 | — |
| | | $8 \times 10^{-3}$ | 0 | 0 | — | 100 | 100 | — |
| | | $2 \times 10^{-2}$ | 0 | 0 | — | 100 | 100 | — |
| | | $4 \times 10^{-2}$ | 2 | 2 | — | 100 | 100 | — |
| | | $2 \times 10^{-1}$ | 5 | 6 | — | 100 | 100 | — |
| | | $1 \times 10^{0}$ | 10 | 9 | — | 100 | 100 | — |
| | | $2 \times 10^{0}$ | 10 | 10 | — | 100 | 100 | — |
| | Metaphosphoric acid | $1 \times 10^{-3}$ | 12 | 11 | — | 70 | 70 | — |
| | | $8 \times 10^{-3}$ | 11 | 12 | — | 80 | 80 | — |
| | | $2 \times 10^{-3}$ | 14 | 12 | — | 80 | 80 | — |
| | | $4 \times 10^{-2}$ | 13 | 14 | — | 70 | 70 | — |
| | | $2 \times 10^{-1}$ | 13 | 12 | — | 50 | 50 | — |
| | | $1 \times 10^{0}$ | 15 | 16 | — | 50 | 50 | — |
| | | $2 \times 10^{0}$ | 16 | 17 | — | 50 | 50 | — |
| Water-based coating composition (I) | Metaboric acid (n = 3 to 6) | $4 \times 10^{-3}$ | — | — | 0 | — | — | 100 |
| | | $4 \times 10^{-2}$ | — | — | 0 | — | — | 100 |
| Water-based coating composition (II) | Metaboric acid (n = 3 to 6) | $1 \times 10^{-3}$ | 7 | 2 | — | 100 | 100 | — |
| | | $2 \times 10^{-2}$ | 0 | 0 | — | 100 | 100 | — |
| | | $4 \times 10^{0}$ | 2 | 2 | — | 100 | 100 | — |
| | Metaphosphoric acid | $2 \times 10^{-3}$ | 12 | 12 | — | 70 | 70 | — |
| | | $2 \times 10^{-2}$ | 10 | 10 | — | 80 | 85 | — |
| | | $4 \times 10^{0}$ | 14 | 18 | — | 70 | 70 | — |
| Water-based coating compositon (III) | Metaboric acid (n = 3 to 6) | $1 \times 10^{-3}$ | 2 | 1 | — | 100 | 100 | — |
| | | $2 \times 10^{-2}$ | 0 | 0 | — | 100 | 100 | — |
| | | $4 \times 10^{0}$ | 2 | 2 | — | 100 | 100 | — |
| | Metaphosphoric acid | $2 \times 10^{-3}$ | 9 | 10 | — | 80 | 80 | — |
| | | $3 \times 10^{-2}$ | 3 | 13 | — | 70 | 75 | — |
| | | $4 \times 10^{0}$ | 14 | 17 | — | 60 | 60 | — |

| | Kind of precipitated silica colloid[1] | Immersion in warm saline solution [peeled width (nm)] | Immersion in warm water [number of remaining squares per 100] |
|---|---|---|---|
| Water-based coating composition (I) (comparison) | SNOWTEX N | 23 | 0 |
| | SNOWTEX up | 25 | 0 |

| Kind of water-based | Kind of colloidizing | Amount of colloidizing agent (aid) | Weldability |
|---|---|---|---|

TABLE 4-continued

| coating composition | agent (aid) | (mol) | AEROSIL 300 | AEROSIL 380 | AEROSIL MOX170 |
|---|---|---|---|---|---|
| Water-based coating composition (I) | Metaboric acid (n = 3 to 6) | $1 \times 10^{-3}$ | G | G | — |
| | | $2 \times 10^{-3}$ | G | G | — |
| | | $4 \times 10^{-3}$ | G | G | — |
| | | $6 \times 10^{-3}$ | G | G | — |
| | | $8 \times 10^{-3}$ | G | G | — |
| | | $2 \times 10^{-2}$ | G | G | — |
| | | $4 \times 10^{-2}$ | G | G | — |
| | | $2 \times 10^{-1}$ | G | G | — |
| | | $1 \times 10^{0}$ | G | G | — |
| | | $2 \times 10^{0}$ | G | G | — |
| | Metaphosphoric acid | $1 \times 10^{-3}$ | G | G | — |
| | | $8 \times 10^{-3}$ | G | G | — |
| | | $2 \times 10^{-3}$ | G | G | — |
| | | $4 \times 10^{-2}$ | G | G | — |
| | | $2 \times 10^{-1}$ | G | G | — |
| | | $1 \times 10^{0}$ | G | G | — |
| | | $2 \times 10^{0}$ | G | G | — |
| Water-based coating composition (I) | Metaboric acid (n = 3 to 6) | $4 \times 10^{-3}$ | — | — | G |
| | | $4 \times 10^{-2}$ | — | — | G |
| Water-based coating composition (II) | Metaboric acid (n = 3 to 6 | $1 \times 10^{-3}$ | G | G | — |
| | | $2 \times 10^{-2}$ | G | G | — |
| | | $4 \times 10^{0}$ | G | G | — |
| | Metaphosphoric acid | $2 \times 10^{-3}$ | G | G | — |
| | | $2 \times 10^{-2}$ | G | G | — |
| | | $4 \times 10^{0}$ | G | G | — |
| Water-based coating composition (III) | Metaboric acid (n = 3 to 6) | $1 \times 10^{-3}$ | G | G | — |
| | | $2 \times 10^{-2}$ | G | G | — |
| | | $4 \times 10^{0}$ | G | G | — |
| | Metaphosphoric acid | $2 \times 10^{-3}$ | G | G | — |
| | | $3 \times 10^{-2}$ | G | G | — |
| | | $4 \times 10^{0}$ | G | G | — |

| | Kind of precipitated silica colloid[1] | Weldability |
|---|---|---|
| Water-based coating composition (I) (comparison) | SNOWTEX N | G |
| | SNOWTEX up | G |

Note [1]In the case of the test pieces prepared using the water-based coating paint compositions (I) containing a precipitated-silica colloid (not containing any of AEROSIL 300, 380, and MOX170), the coated films develop a white rust in an extremely early stage and the rust wholly turns into a red rust within 200 cycles. Hence, the proportion of white-rust area (%) was determined after 50 cycles and 100 cycles, when the proportion reaches almost 100%.

TABLE 5

Results of CCT-I 200 cycles (relationship between colloidizing agent (aid) amount and the anticorrosive properties of coated film

| Kind of water-based coating composition | Kind of colloidizing agent (aid) | Amount of colloidizing agent (aid) (mol) | Proportion of white-rust area (%) | |
|---|---|---|---|---|
| | | | AEROSIL 300 | AEROSIL MOX170 |
| Water-based coating (IV) | Metaboric acid (n = 3 to 6) | $1 \times 10^{-3}$ | 40 | — |
| | | $2 \times 10^{-3}$ | 10 | — |
| | | $4 \times 10^{-3}$ | 10 | — |
| | | $6 \times 10^{-3}$ | 10 | — |
| | | $8 \times 10^{-3}$ | 15 | — |
| | | $2 \times 10^{-2}$ | 30 | — |
| | | $4 \times 10^{-2}$ | 20 | — |
| | | $2 \times 10^{-1}$ | 30 | — |
| | | $1 \times 10^{0}$ | 20 | — |
| | | $2 \times 10^{0}$ | 20 | — |
| | Metaphosphoric acid | $1 \times 10^{-3}$ | 60 | — |
| | | $8 \times 10^{-3}$ | 40 | — |
| | | $2 \times 10^{-2}$ | 40 | — |
| | | $4 \times 10^{-2}$ | 30 | — |
| | | $2 \times 10^{-1}$ | 30 | — |
| | | $1 \times 10^{0}$ | 25 | — |
| | | $2 \times 10^{0}$ | 30 | — |
| | Metaboric acid (n = 3 to 6) | $4 \times 10^{-3}$ | — | 10 |
| | | $4 \times 10^{-2}$ | — | 20 |

| | Kind of precipitated silica colloid[1] | Proportion of white-rust area (%) | |
|---|---|---|---|
| | | 50 cycles | 100 cycles |
| Water-based coating composition (IV) | SNOWTEX N | 80 | 100 |
| | SNOWTEX up | 50 | 90 |

TABLE 5-continued

Results of CCT-I 200 cycles (relationship between colloidizing
agent (aid) amount and the anticorrosive properties of coated film (comparison)

Note [1] In the case of the test pieces prepared using the water-based coating compositions (I) or (IV) containing a precipitated-silica colloid (not containing any of AEROSIL 300, 380, and MOX170) as a comparative example, the coated films develop a white rust in an extremely early stage and the rust wholly turns into a red rust within 200 cycles. Hence, the proportion of white-rust area (%) was determined after 50 cycles and 100 cycles, when the proportion reaches almost 100%.

TABLE 6

| | Kind of colloidizing agent (aid) | Amount of colloidizing agent (aid) (mol) | Proportion of white-rust area (%) [CCT-I, 200 cycles] | | | Appearance of electrodeposited film | | |
|---|---|---|---|---|---|---|---|---|
| | | | AEROSIL 300 | AEROSIL 380 | AEROSIL MOX170 | AEROSIL 300 | AEROSIL 380 | AEROSIL MOX170 |
| Example 8 | Metaboric acid | $8 \times 10^{-3}$ | 10 | — | — | E | — | — |
| Example 9 | " | " | 5 | — | — | E | — | — |
| Example 10 | " | " | 15 | — | — | E | — | — |
| Example 11 | " | " | 20 | — | — | E | — | — |
| Example 12 | " | " | 10 | — | — | E | — | — |
| Example 13 | " | " | 10 | — | — | E | — | — |

| | Kind of colloidizing agent (aid) | Amount of colloidizing agent (aid) (mol) | Immersion in warm saline solution [peeled width (mm)] | | | Immersion in warm water [number of remaining squares per 100] | | |
|---|---|---|---|---|---|---|---|---|
| | | | AEROSIL 300 | AEROSIL 380 | AEROSIL MOX170 | AEROSIL 300 | AEROSIL 380 | AEROSIL MOX170 |
| Example 8 | Metaboric acid | $8 \times 10^{-3}$ | 0 | — | — | 100 | — | — |
| Example 9 | " | " | 0 | — | — | 100 | — | — |
| Example 10 | " | " | 0 | — | — | 100 | — | — |
| Example 11 | " | " | 0 | — | — | 100 | — | — |
| Example 12 | " | " | 0 | — | — | 100 | — | — |
| Example 13 | " | " | 0 | — | — | 100 | — | — |

| | Kind of colloidizing agent (aid) | Amount of colloidizing agent (aid) (mol) | Weldability | | |
|---|---|---|---|---|---|
| | | | AEROSIL 300 | AEROSIL 380 | AEROSIL MOX170 |
| Example 8 | Metaboric acid | $8 \times 10^{-3}$ | G | — | — |
| Example 9 | " | " | G | — | — |
| Example 10 | " | " | G | — | — |
| Example 11 | " | " | G | — | — |
| Example 12 | " | " | G | — | — |
| Example 13 | " | " | G | — | — |

While the invention has been described in detail and with reference to specific embodiments thereof, it will be apparent to one skilled in the art that various changes and modifications can be made therein without departing from the spirit and scope thereof.

What is claimed is:

1. A water-based coating composition which comprises a colloidal particle dispersion comprising mainly (1) a fumed silica or fumed aluminum silicate, (2) a colloidizing agent (aid) which is at least one compound selected from the group consisting of a phosphoric acid compound, a molybdic acid compound, a boric acid compound, and a silicic acid compound, and (3) water.

2. The water-based coating composition as claimed in claim 1, wherein the water-based coating composition contains at least one water-soluble or water-dispersible resin selected from the group consisting of an alkyd resin, a polyester resin, an epoxy resin, an urethane resin, and an aminoplast resin.

3. The water-based coating composition as claimed in claim 1, wherein the water-based coating composition contains at least one emulsified resin selected from the group consisting of a vinyl acetate resin, an acrylic resin, a styrene-butadiene resin, an epoxy resin, and an urethane resin.

4. The water-based coating composition as claimed in claim 1, wherein the water-based coating composition is an epoxy resin emulsion.

5. The water-based coating composition as claimed in claim 1, wherein the amount of the colloidal particles is from 15 to 60 parts by weight per 100 parts by weight of the resin in the water-based coating composition on a solid basis.

6. The water-based coating composition as claimed in claim 1, wherein the amount of the colloidal particles is from 20 to 40 parts by weight per 100 parts by weight of the resin in the water-based coating composition on a solid basis.

7. The water-based coating composition as claimed in claim 1, which further contains a melamine cyanurate.

8. The water-based coating composition as claimed in claim 7, wherein the amount of the melamine cyanurate is from 0.05 to 25 parts by weight per 100 parts by weight of the solid components of the water-based coating composition on a solid basis.

9. The water-based coating composition as claimed in claim 7, wherein the amount of the melamine cyanurate is from 0.5 to 6 parts by weight per 100 parts by weight of the solid components of the water-based coating composition on a solid basis.

10. The water-based coating composition as claimed in claim 7, wherein the solid/solvent ratio is (20 to 50)/(80 to 50) by weight and the solid components have a resin/colloidal particle/melamine cyanurate ratio of (55 to 90)/(10 to 40)/(0 to 5) by weight, and which contains a crosslinking agent and a functional resin capable of reacting with the crosslinking agent, with the functional resin/crosslinking agent ratio being from 90/10 to 70/30 and the functional resin being an epoxy resin emulsion.

* * * * *